United States Patent [19]

Cunningham

[11] 4,203,354
[45] May 20, 1980

[54] HYDRAULIC PISTON WITH METALLIC O-RING GROOVE AND NON-METALLIC SLIDABLE SURFACES

[75] Inventor: Joseph A. Cunningham, South Bend, Ind.

[73] Assignee: The Bendix Corporation, Southfield, Mich.

[21] Appl. No.: 914,305

[22] Filed: Jun. 12, 1978

Related U.S. Application Data

[63] Continuation of Ser. No. 752,366, Dec. 20, 1976, abandoned.

[51] Int. Cl.² ............................ F16J 1/00; F16J 9/08; F16J 11/04
[52] U.S. Cl. .................................... 92/169; 92/182; 92/248; 92/258
[58] Field of Search .................. 92/182, 240, 248, 249, 92/255, 258, 250, 251, 252, 169; 277/188 A; 188/264 G

[56] References Cited

U.S. PATENT DOCUMENTS

| 2,801,714 | 8/1957 | Dotto | 188/264 G |
| 2,862,736 | 12/1958 | Russell | 277/188 A |
| 2,926,976 | 3/1960 | Bowerman et al. | 92/240 |
| 3,017,861 | 1/1962 | Dobrikin | 92/249 X |
| 3,146,683 | 9/1964 | Hoffmann | 92/252 X |
| 3,166,991 | 1/1965 | Blenkle | 92/240 X |
| 3,168,301 | 2/1965 | Allinquant | 92/240 X |
| 3,403,759 | 10/1968 | Holcomb, Jr. | 188/264 AA |
| 3,503,475 | 3/1970 | Mione | 188/264 G |
| 3,603,215 | 9/1971 | Leschisin | 92/240 X |
| 3,678,809 | 7/1972 | Doutt | 92/249 X |

*Primary Examiner*—Irwin C. Cohen
*Attorney, Agent, or Firm*—Leo H. McCormick, Jr.; Ken C. Decker

[57] ABSTRACT

A fluid pressure actuated piston that consists of two parts, a metallic portion and a nonmetallic portion, is disposed in a conventional, metallic, cylindrical housing. The non-metallic portion is slidably engaged with the metallic housing. The metallic portion has a clearance to prevent contact with the metallic housing and is connected to the non-metallic portion in such a manner as to provide a recess for a conventional O-ring seal. The recess has metallic O-ring sealing surfaces on both the piston and the housing without any metallic contact to the housing.

2 Claims, 1 Drawing Figure

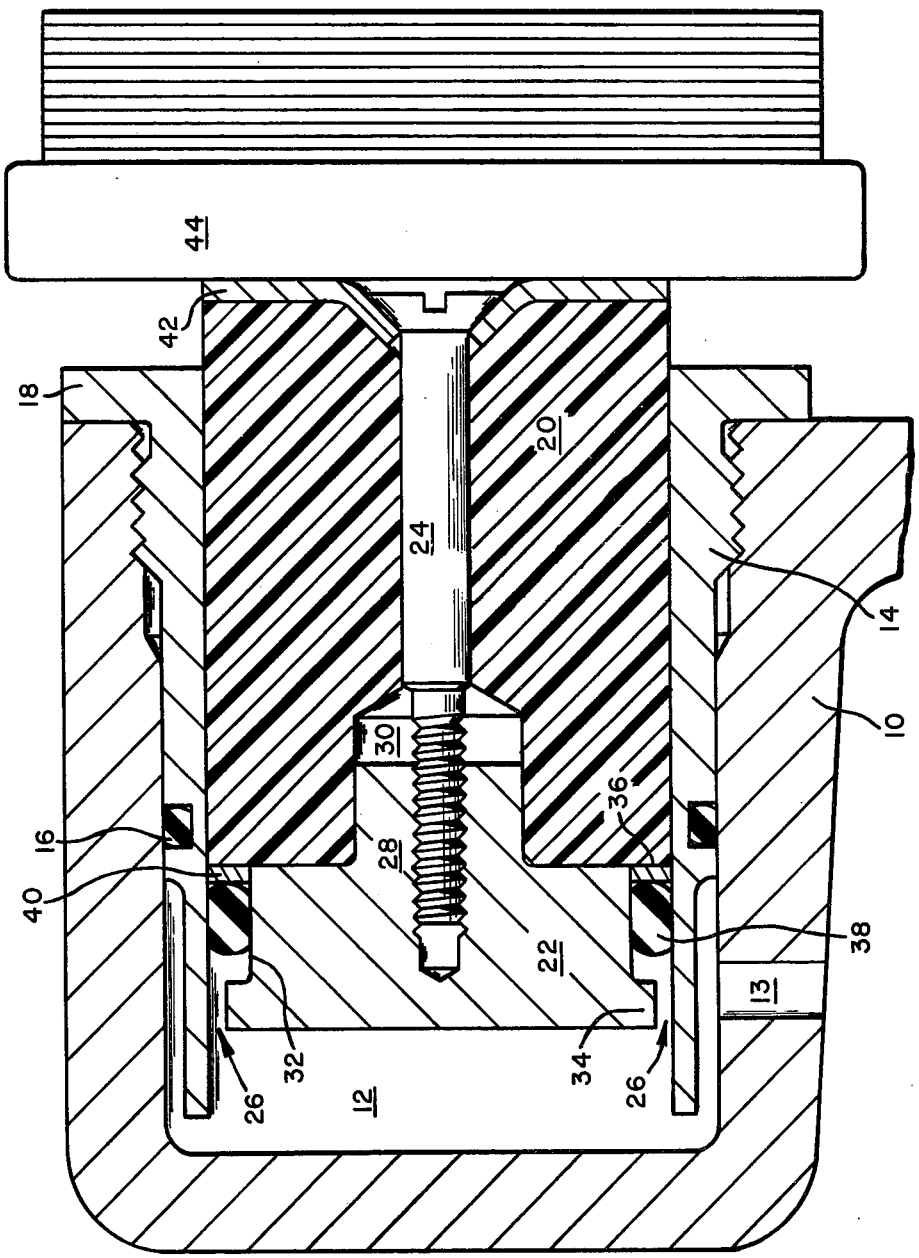

HYDRAULIC PISTON WITH METALLIC O-RING GROOVE AND NON-METALLIC SLIDABLE SURFACES

This is a continuation of application Ser. No. 752,366, filed Dec. 20, 1976, and now abandoned.

BACKGROUND OF THE INVENTION

The present invention relates to fluid pressure actuated force generating pistons that only have a non-metallic contact with the metallic cylindrical housing walls. This invention is particularly useful in the aircraft wheel and brake art because of its high reliability and long interval between maintenance. The aircraft brakes use multiple frictional surfaces and it is desired to have the piston assemblies perform as long as the frictional material, without maintenance. The preferred embodiment is designed to fit in an aircraft wheel disc brake assembly as generally shown in U.S. Pat. Nos. 3,403,759 and 2,888,101, however, the piston assembly of the present invention is not necessarily restricted to this field.

All prior art known to the applicant provide some metal-to-metal contact between the sliding surfaces which cause wear and subsequent seal leakage. The present invention eliminates the metal-to-metal sliding surfaces thereby decreasing wear and increasing the operable life of the piston and housing, yet, utilizes and retains the advantages of metallic sealing surfaces.

SUMMARY OF THE INVENTION

The present invention provides a fluid pressure actuated piston which does not have any conventional metal-to-metal sliding surfaces. The piston, which is contained in a conventional metallic cylinder housing, consists of two parts, a metallic inner portion and a non-metallic outer portion. The non-metallic outer portion is engaged with the metallic cylinder housing while the metallic inner portion is of a smaller diameter to provide clearance between it and the metallic cylinder. The non-metallic outer and the inner metallic pistons are connected so that a concentric O-ring recess is maintained at the annular junction wall. The metal-to-metal O-ring sealing surfaces allow the conventional quality of fluid seal.

It is an object of the present invention to reduce piston-cylinder wear by providing a non-metallic piston with the same quality of fluid seal as obtained with the conventional metallic pistons.

BRIEF DESCRIPTION OF THE DRAWING

The drawing is a sectional view of a piston assembly used in the aircraft wheel and brake art, with the piston adapted to provide the novel O-ring recess of the present invention.

DESCRIPTION OF THE PREFERRED EMBODIMENT

Referring to the FIGURE, numeral 10 designates a piston housing provided with a cavity 12 and has a fluid port 13 which allows pressurized fluid into cavity 12 from a controlled source, not shown. Cavity 12 is provided with a sleeve 14 threadedly engaged with housing 10 and provided with an annular recess containing an "O" ring or similar fluid seal 16. Sleeve 14 is composed of a conventional metal suitable to provide a good fluid pressure sealing surface. Sleeve 14 also has a flange portion 18 adapted to be engaged by wrench means, not shown, for assembly and disassembly purposes. Although the preferred embodiment indicates a sleeve 14, it is not needed with applicant's invention. Conventional piston assemblies, those that have metal-to-metal contact, wear out the fluid pressure sealing surface and it's much easier to replace a sleeve 14 than the housing 10. Applicant's invention eliminates the metal-to-metal contact and substantially reduces wear on the fluid pressure sealing surface. This reduced wear enables the inside surface of housing 10 to be adapted to provide the metallic fluid pressure sealing surface thereby omitting sleeve 14.

The pressure responsive piston is composed of two parts, outer piston 20, which is composed of a nonmetallic substance, and inner piston 22, which is composed of a conventional metal suitable for fluid pressure sealing surfaces. Outer piston 20 has an outside diameter sufficient to allow its cylindrical surface to slidably engage sleeve 14. Inner piston 22 has an outside diameter which is just smaller than the outside diameter of the outer piston 20. Pistons 20, and 22 are coaxially secured together by screw 24 threaded into piston 22. To maintain the coaxial position of piston 22 to piston 20, piston 22 has a cylindrical coaxial abutment 28 received in the cylindrical hole 30 of outer piston 20. The coaxial arrangement allows piston 22's smaller diameter to provide a cylindrical gap 26 between the outer surface of piston 22 and the inner surface of sleeve 14.

The novel fluid seal recess of the present invention is formed by annular fluid sealing surface 32 and fluid pressure seal stop 36. Stop 36 is created by a portion of the rearward annular surface area of piston 20 which is exposed due to the difference in diameters between piston 20 and annular surface 32. A back-up ring 40 is shown disposed between fluid seal 38 and surface area 36. The use of back-up rings, co-termed as non-extrusion rings, are well known in the art and are necessary at high fluid pressure to prevent the "O" ring from being squeezed into the small space between the slidably engaged surfaces of piston piston 20 and sleeve 14. Military Specification No. MIL-P-5514F, dated Jan. 15, 1969, teaches the use of back-up rings. Although not necessary for the operation of applicant's novel seal assembly, piston 22 is provided with an annular shoulder 34 which retains the O-ring 38 and back-up ring 40 during installation and removal.

An abrasion shield 42 is used to separate piston 20 from pressure plate 44 because of the heat developed during braking. Shield 42 is held in place by screw 24 and acts as an insulator to retard heat transfer into piston 20. The piston 20 assembly only bears against the pressure plate 44 during operation in the referenced aircraft disc brake environment.

Many other piston configurations are possible without deviating from applicant's novel fluid seal recess construction as recited in the claims. For example, piston 22 can be secured to piston 20 in various ways to insure a non-engagement of the metallic surfaces. Both pistons may be non-metallic so long as the annular fluid sealing surface 32 is metal. The piston assembly can also be constructed from a single piston. Furthermore, piston 20 does not have to be entirely non-metallic, it only needs a non-metallic surface engaged with sleeve 14.

I claim:

1. A fluid pressure actuated piston assembly comprising:

a housing having a cavity therein, said cavity having at least one closed end;

a metallic cylindrical member fixed to said housing and extending into said cavity, said cylindrical member having a bore therein connected to said cavity, said bore defining a first fluid pressure sealing surface;

a non-metallic piston located in said bore and cooperating with said housing to define a pressure chamber in said cavity, said non-metallic piston having a peripheral surface directly engaging said first fluid pressure sealing surface in said metallic cylindrical member, said peripheral surface being non-metallic attenuating wear of said metallic first fluid pressure sealing surface, said non-metallic piston having a first face with a hole therein and located in said bore and a second face located outside said housing;

a metallic piston located in said pressure chamber having a first diameter section separated from a second diameter section by a first shoulder and a third diameter section separated from said second diameter section by a second shoulder, said first diameter section being smaller than said first fluid pressure sealing surface, said second diameter section being smaller than said first diameter section, and said third diameter section being smaller than said second diameter section;

fastener means for holding said second diameter section of said metallic piston against said first face of said non-metallic piston to establish a second sealing surface on said second diameter section and a third sealing surface on said first face, said third diameter section being positioned in said hole in engagement with the walls thereof, said fastener means, said third diameter section and said non-metallic piston cooperating to hold said first diameter section concentric to said bore to prevent the first diameter section from contacting said first fluid pressure sealing surface; and sealing means located between said first and second fluid pressure sealing surface, said sealing means responding to fluid pressure in said pressure chamber by moving into engagement with said third sealing surface and thereafter being compressed to radially expand into a fluid-tight engagement with said first and second fluid pressure sealing surfaces to prevent fluid from being communicated from said pressure chamber through said bore.

2. The fluid pressure actuated piston assembly as recited in claim 1 further including:

a ring member located between said sealing means and said first face of the non-metallic piston to prevent the sealing means from being extruded between said peripheral surface of the non-metallic piston and said first fluid pressure sealing surface with fluid pressure in the pressure chamber.

* * * * *